V. E. JULLIEN.
SLITTERS.
APPLICATION FILED FEB. 1, 1913.

1,127,448.

Patented Feb. 9, 1915.
7 SHEETS—SHEET 2.

Fig. 2

Witnesses:
George F. Roth.
M. S. Belden.

Inventor
Victor Edmund Jullien.
By James W. See
Attorney

V. E. JULLIEN.
SLITTERS.
APPLICATION FILED FEB. 1, 1913.

1,127,448.

Patented Feb. 9, 1915.
7 SHEETS—SHEET 5.

Witnesses:

Inventor
Victor Edmund Jullien.
By James W. See Attorney

UNITED STATES PATENT OFFICE.

VICTOR EDMUND JULLIEN, OF CINCINNATI, OHIO.

SLITTERS.

1,127,448.  Specification of Letters Patent.  Patented Feb. 9, 1915.

Application filed February 1, 1913. Serial No. 745,554.

*To all whom it may concern:*

Be it known that I, VICTOR EDMUND JULLIEN, a citizen of the United States, residing at Cincinnati, Hamilton county, Ohio, have invented certain new and useful Improvements in Slitters, of which the following is a specification.

This invention comprehends a machine adapted for the slitting of a wide fabric into several narrow strips, the edges of the strips being either straight of sinusoidal as desired.

While the machine is applicable for use in the slitting of any fabric for any purpose it has been devised with special reference to the cutting of strips, with sinusoidal edges, to be later cut up to form sole-linings for shoes. The fabric employed for these sole-linings is a compound fabric formed of canvas with a rubber-like composition on one side. The sinusoidal edged strips of this compound material are wound up into rolls, and the exigencies of shoe manufacture render it important that the rolls shall have their composition side inward and that the strip shall unwind heel-first.

My invention will be readily understood from the following description taken in connection with the accompanying drawings in which:—

For the slitting-knives it is my preference to use a series of sharp-edged rotary cutters co-acting with an opposing agent and, further, it is my preference that the opposing agent be another sharp-edged circular cutter, each cut being therefore done by a pair of co-acting circular cutters as is usual in slitters.

Figures 6, 8:
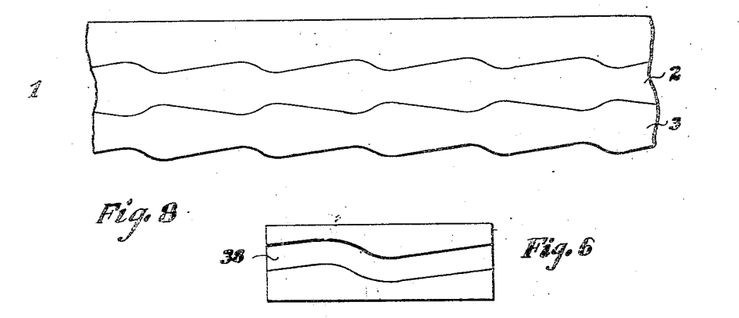
Fig. 6 a panorama of one of the contouring cams.
Fig. 8 a plan of a portion of the wide fabric with lines indicating the nature of the sinusoidal cuts in the particular case of sole-linings.
Figure 7:
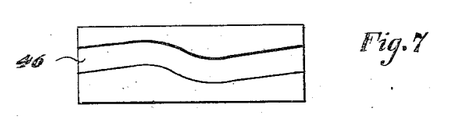
Fig. 7 a panorama of one of the knife-swiveling cams.

In the drawings, and giving attention for the present only to Fig. 8:—1, indicates the wide fabric which is to be slitted into narrow strips: 2, one of the strips to be produced by the slitting: and 3, a contiguous strip to be produced by the slitting.

The strips 2 and 3 have sinusoidal edges and their contour is such as to adapt them for sole-lining for shoes, the strips being later cut into proper lengths. The strip 2 has the toe-portions of its sections pointing to the left, while the strip 3 has the toe-portions pointing to the right, and, correspondingly, with all of the strips cut from the wide fabric, the illustrated contours being such that there is no waste of material except at the extreme edges of the wide fabric.

Figure 1:
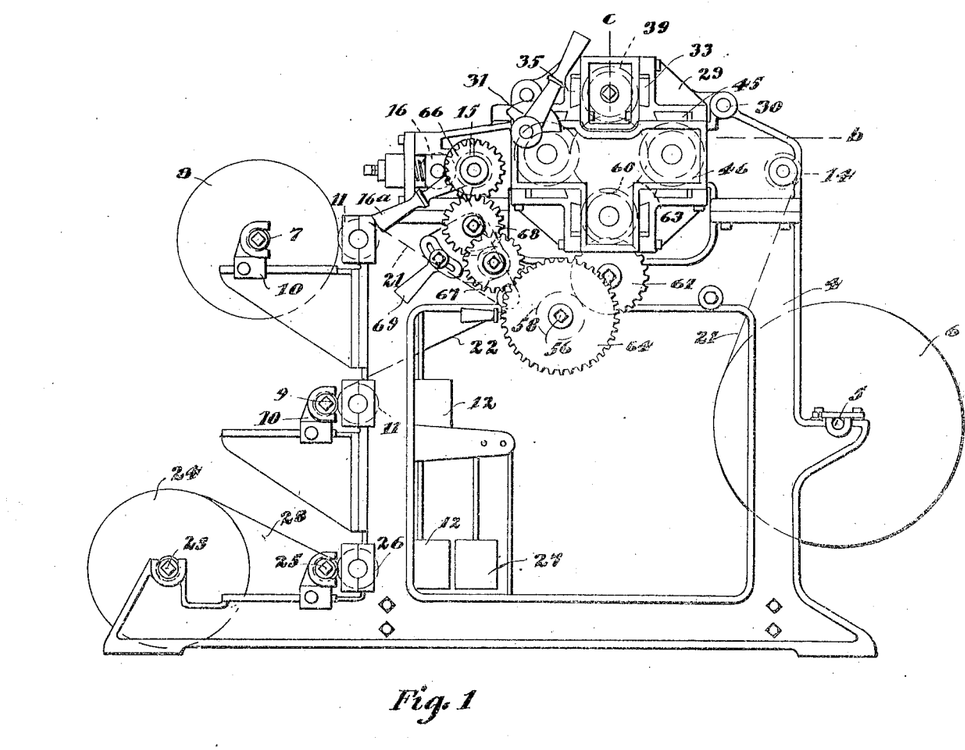
Figure 1 is a side elevation of a slitting machine exemplifying my invention.
Figure 2:
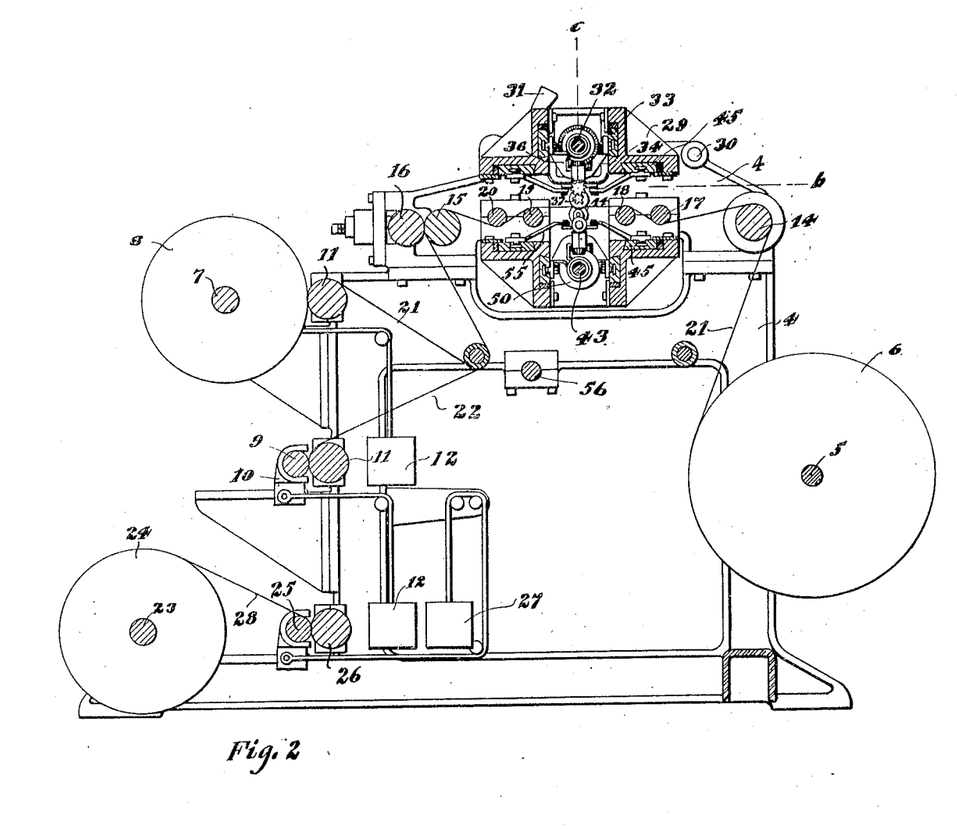
Fig. 2 a vertical longitudinal section of the same in the plane of line *a* of Figs. 3, 4 and 5.
Figure 3:
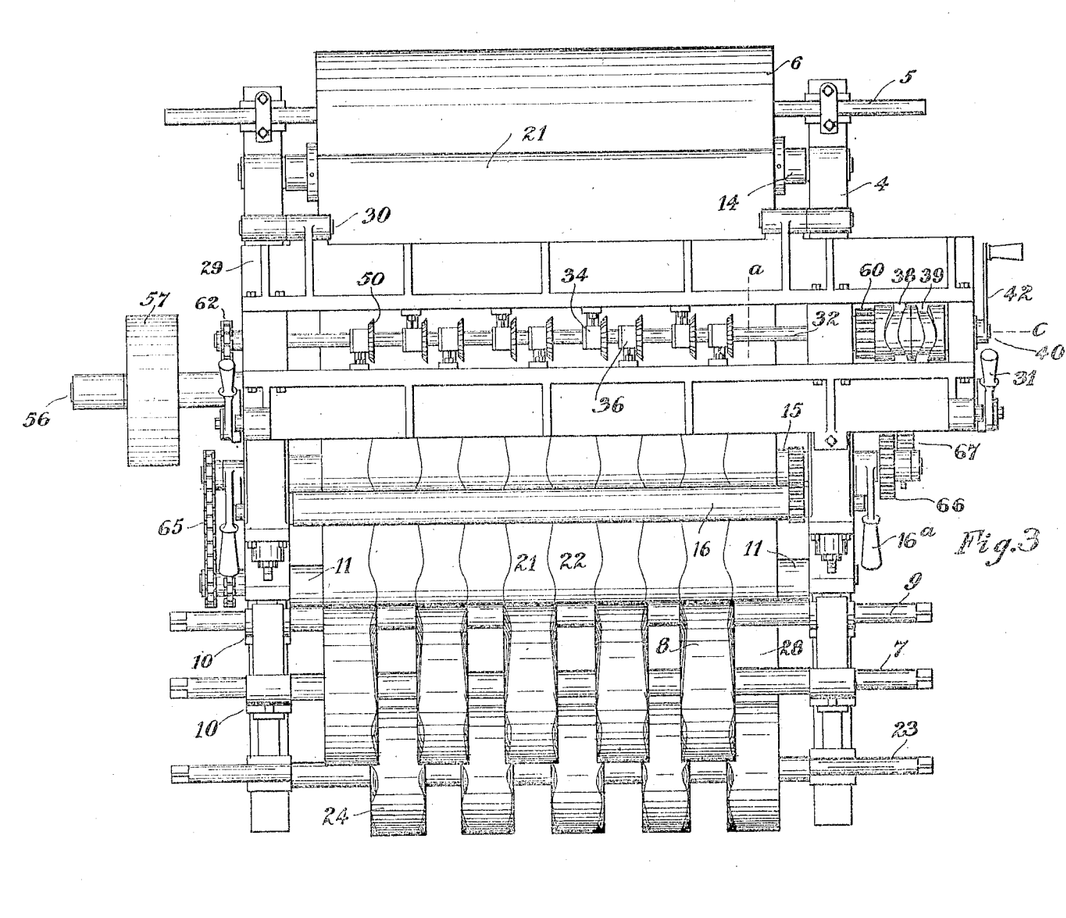
Fig. 3 a plan.
Figure 4:
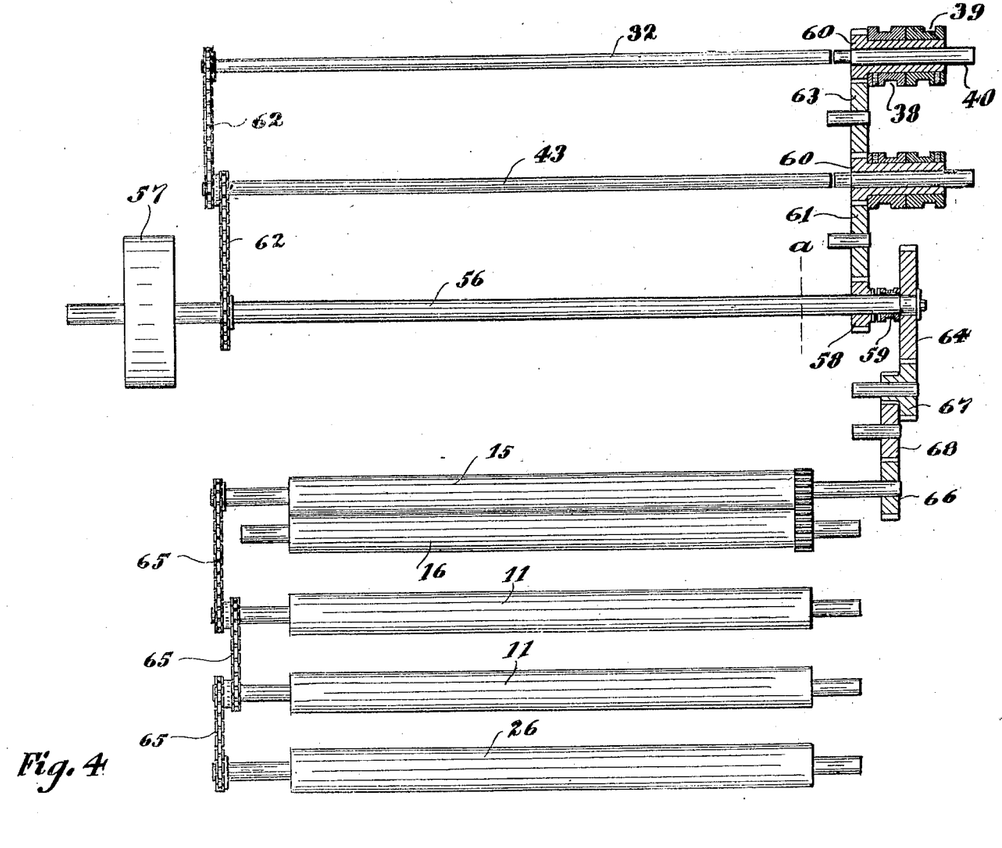
Fig. 4 a plan, somewhat diagrammatic, illustrating the transmission system, certain gears and cams appearing in diametrical section.
Figure 5:
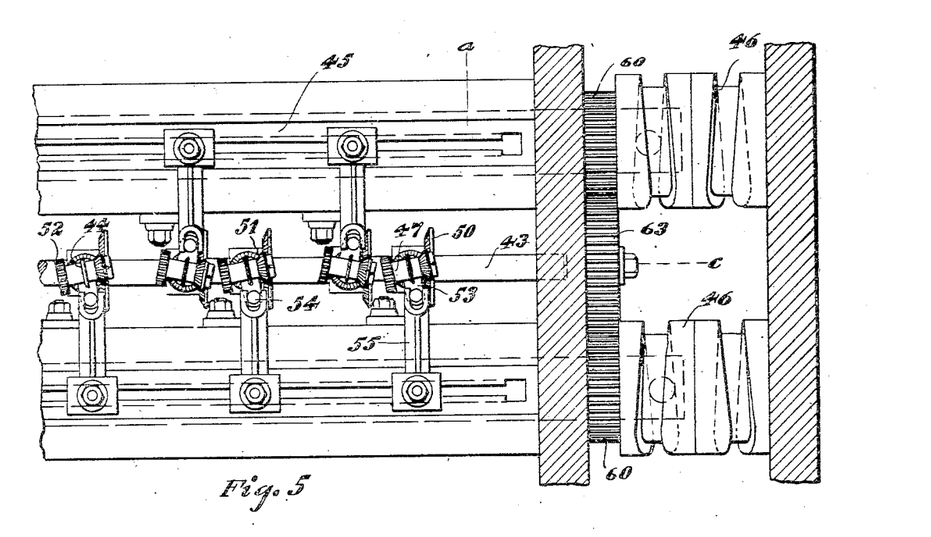
Fig. 5 a plan of some of the lower slitters with their immediate accessories, certain frame-parts appearing in horizontal section in the plane of line *b* of Figs. 1, 2 and 9.

Proceeding with the drawings and giving attention particularly to Fig. 2:—4, indicates general frame-parts of the machine: 5, shaft for the supply-roll of fabric: 6, supply-roll of wide fabric mounted on this shaft, it being assumed that in the case of compound fabric for sole-lining the coated side of the fabric is on the inner surface of the material on the roll: 7, winding-shaft on which is to be wound those strips coming to it with toe-portions first: 8, the rolls of toe-first strips wound on this shaft: 9, winding shaft on which is to be wound the heel-first strips: 10, sliding carriages carrying the bearings for winding-shafts 7 and 9: 11, surface winder-rolls, one for each of the mentioned winding shafts, these winder-rolls being driven by power and being adapted to make contact with the winding-shafts or with the rolls upon those shafts, the winding-shafts moving outwardly away from the winder-rolls as the rolls increase in diameter: 12, weights connected with the carriages of rolls 7 and 9 and adapted to urge those rolls toward their winder-rolls so that the winder-rolls will, by frictional engagement with the winding-strips cause the winding-rolls to turn and the winding to progress: 14, a guide-roll above the roll of fabric 6: 15, a feed-roll disposed between the supply-roll and the winding-rolls: 16, a spring-pressed feed-roll coöperating with feed-roll 15, these two feed-rolls being power-driven and adapted to draw the slitted fabric between them on its way from the supply-roll to the winding-rolls: 16ª, cam-levers to separate the feed-rolls: 17, 18, 19 and 20 tension-rolls extending across the machine, roll 17 being above and roll 18 being below the wide fabric before it reaches the slitters, while roll 19 is below and roll 20 is above the slitted fabric shortly after leaving the slitters, the inner rolls, 18 and 19 not being rotary or rolls in fact but being stationary surfaces over which the fabric may be drawn on its way past the slitters: 21, the fabric in its course from the supply-roll past the tension-rolls and slitters and through the feed-rolls and, as concerns the toe-first strips, to the rolls 8: and 22, the heel-first strips on their way from the feed-rolls to the rolls on winding-shaft 9.

Understanding that the slitters themselves, which will be later described, operate between the rolls 18 and 19, and understanding that, for sinusoidal slitting, these slitters are constantly shifting sidewise of the fabric, the mode of operation of the parts thus far referred to will be described.

The feed-rolls, driven at determined circumferential speed, as will be later explained, draw the slitted fabric forward from the slitters and, the ends of the toe-first strips having been properly secured to winding shaft 7 and the ends of the heel-first strips having been fastened to winding shaft 9, winder rolls 11, having the same peripheral velocity as the feed-rolls, or a trifle greater velocity, cause the strips to be wound up on the two winding shafts. In the absence of the tension-rolls the fabric would have such a long stretch between guide-roll 14 and the feed-rolls that it would sag and misbehave in the slitters and, furthermore, the fabric would be free to shift sidewise under the influence of the sidewise moving slitters. The arrangement of the two pairs of tension-rolls, one pair before and the other after the slitters, greatly shortens the stretch of fabric at the slitters and offers such resistance to the advance of the fabric as to make the fabric taut where it is engaged by the slitters. The inner tension-rolls 18, 19, being non-rotary, serve to offer very much more side resistance to the shifting of the fabric under the influence of the sidewise moving slitters than would be the case if these inner rolls were rotary. These inner rolls need not be rolls in fact, or even cylindrical, their function being that of friction bars over which the fabric bends before and after the slitting.

Assuming, as has been done, that winding-shaft 7 receives the toe-first strips, and understanding that the coated side of the compound fabric is inward on roll 6, it will be apprehended that the strips forming rolls 8 are not only wound toe-first but that they have the canvas side outward, as is desired in the shoe factory. But the strips wound upon winding-shaft 9, while they have the canvas side outward, are wound up heel-first, a condition not desired in the shoe factory. Means are provided for treating these heel-first strips so as to secure the desired condition of toe-first canvas-outward winding.

Proceeding with the drawings:—23, indicates a winding-shaft on which has previously been wound the heel-first strips, this shaft having previously occupied the position of winding-shaft 9: 24, the rolls of heel-first strips on shaft 23: 25, a winding-shaft on which is to be rewound, in toe-first manner, the strips forming rolls on shaft 23, this winding-shaft 25 being journaled in sliding boxes in the same manner as winding-shafts 7 and 9: 26, a winder-roll coöperating with winding-shaft 25 to draw the strips from rolls 24 and wind them upon shaft 25: 27, a weight to draw winding-shaft 25 against its coöperating winder-roll 26: and 28, the strips on their way, toe-first, from rolls 24 to winding-shaft 25.

It will be obvious that by the rewinding means described, the strips received heel-first from the slitters become rewound toe-first so as to be similar to the strips forming rolls 8.

Proceeding with the drawings: 29, indicates a movable upper portion of the general frame, the frame-portion carrying the upper slitters: 30, a hinge, with its axis extending across the machine, this hinge joining the upper frame-portion 29 to the main frame: 31, cam-levers coöperating with the main frame and its hinged portion 29 and serving as means for elevating the upper frame-portion and the upper slitters: 32, the upper slitter-shaft, this shaft extending across the machine and being journaled in upper frame-portion 29: 33, a bar mounted in upper frame-portion 29 alongside and parallel with slitter-shaft 32, this bar being mounted for endwise reciprocation and being provided with a lengthwise extending T-slot: 34, brackets bolted to bar 33, through the medium of bolts engaging the T-slots, there being one of these brackets for each intermediate one of the upper slitters: 35, a second T-slotted reciprocating bar alongside the upper slitter-shaft 32: 36, brackets, similar to brackets 34, but bolted to the second reciprocating bar 35, there being one of these brackets 36 for each of the remaining upper slitters, bar 35 therefore carrying the brackets for alternating slitters while bar 33 carries the brackets for the intermediate slitters: 37, the upper slitters carried by brackets 34 and 36, their manner of mounting being later described: 38, a circumferentially grooved cam disposed at one side of the machine and having its groove engaged by a pin projecting from bracket-carrying bar 33, this cam being arranged to be continuously turned by power as hereinafter explained: 39, a similar cam combined with cam 38 and having its groove engaged by a pin projecting from bracket-carrying bar 35: 40, the spindle on which cams 38 and 39 turn: 41, a screw on this spindle, this screw engaging a fixed portion of the frame: and 42, a handle on this spindle.

Disregard, for the present, the fact that the upper slitters coöperate with lower slitters and assume that the upper slitters coöperate with any suitable opposing agent over which the fabric is drawn such, for instance, as a plain surface or a plain roller. Cams 38 and 39 are to have their grooves so formed as, at each turn of the cams, to give the bracket-carrying bars 34 and 35 such endwise movements as will shift the slitters to produce the desired sinusoidal cutting. Looking at strip 2, in Fig. 8, that strip has varying widths. The slitters cutting the upper line of strip 2 and the upper lines of the other toe-first strips will be shifted by the cam actuating the bracket-carrying bar of the slitters for those lines, while the slitters cutting the lower line of strip 2 and the lower lines of the other toe-first strips will be controlled by the other cam. The sinusoidal contours of the strips are thus dependent upon the formation of the cams. In the particular instance illustrated in Fig. 8, the slitters at the two sides of a given strip recede from and approach each other as the fabric is being drawn past the slitters. The brackets carrying the slitters can be adjusted to different positions upon their reciprocating carrying-bars, thus providing for selections in general width of the strips.

If, now, it should be desired to produce strips having straight edges the desire may be accomplished by setting the slitters at the desired distance from each other and then permitting the two cams to remain stationary, as by disconnecting them from their driving power. If it should be desired to produce lines of cutting sinusoidal but parallel with each other, so that all portions of a given strip are of equal width, it may be accomplished by securing all of the brackets of the upper slitters to a single one of the bracket-carrying bars or, alternatively, by so forming the two cams that the two bracket-carrying bars will reciprocate in unison. It is of course to be understood that the contour lines must be provided for by proper forming of the cams, regardless of whether or not the sinusoidal lines of cutting are to be parallel with each other or at varying distances from each other, as in Fig. 8. But it should here be explained that, whatever be the form of the cams, and the consequent form of the lines of slitting, the relation of width to length in the sinusoidal patterns may be modified by varying the rate of travel of the fabric past the slitters in relation to the rate of turning of the cams, all of which is provided for as will be later explained.

Figure 9:
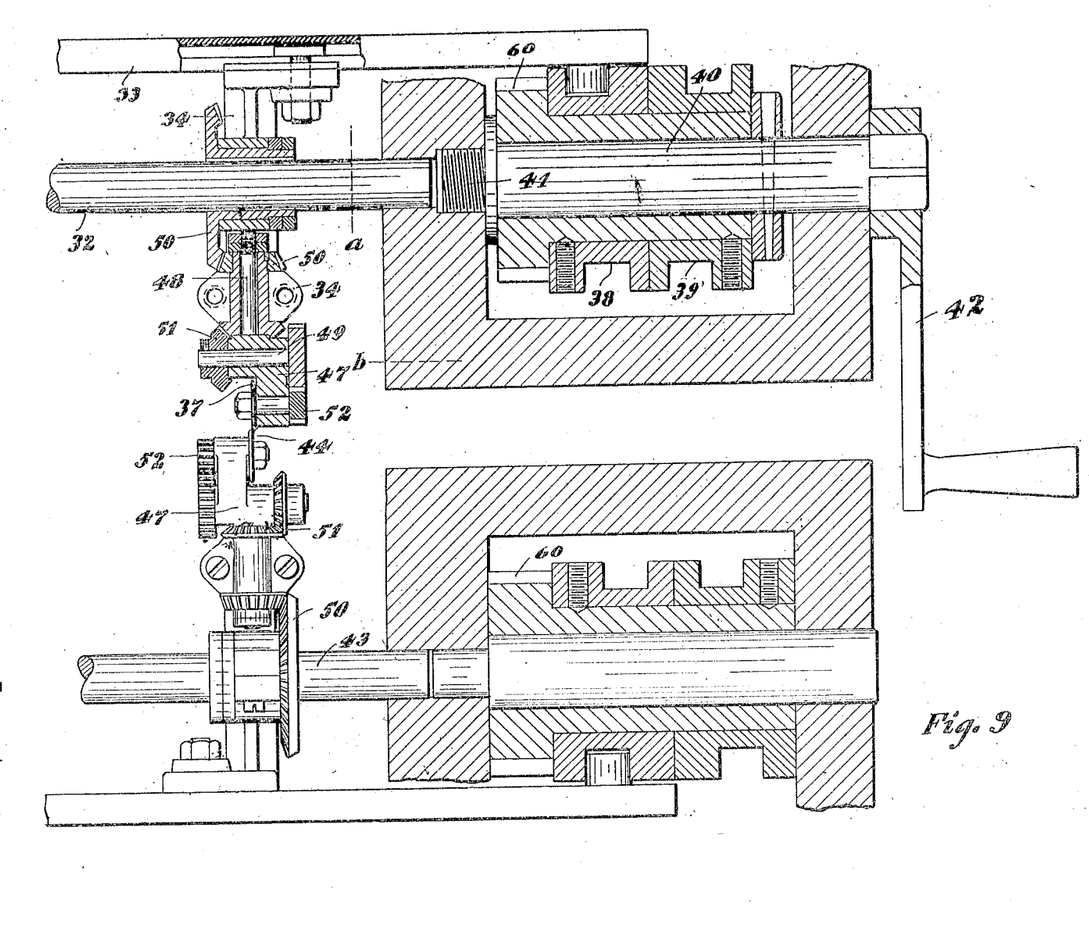
Fig. 9 a vertical transverse section of a pair of cutters, the section being in the plane of line *c* of Figs. 1, 2, 3 and 5.
Figures 10, 11:
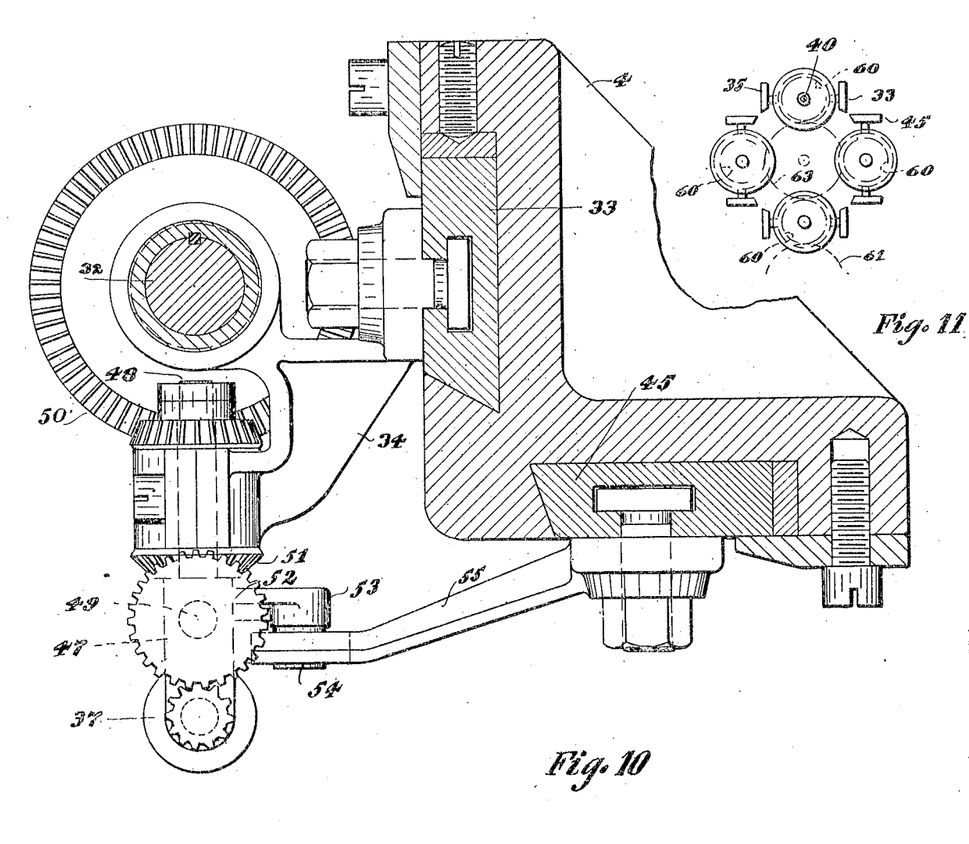
Fig. 10 a side elevation of one of the upper cutters and its immediate accessories, certain parts appearing in vertical section in the plane of line *a* of Figs. 3, 4, 5 and 9.
Fig. 11 a side elevation largely diagrammatic, showing the controlling bars and the cams which actuate them.

In threading up the machine the upper slitters can be lifted out of the way by means of cam-levers 31, in an obvious manner. Where upper slitters are employed in conjunction with coöperating lower slitters, as is the case in the illustration, it becomes desirable to separate one set of slitters from the others before the upper slitters are raised and, in any case, before, the upper slitters are against returned to their association with the lower slitters. This is accomplished, referring to Fig. 9, by turning handle 42 and unscrewing spindle 40 sufficiently to withdraw the upper slitters away from the faces of the lower slitters.

Proceeding with the drawings:—43, indicates the lower slitter-shaft: 44, the lower slitters, one to coöperate with each of the upper slitters after the manner usual with rotary slitters, these lower slitters being carried in brackets secured to slotted reciprocating bars precisely the same as in the case of the upper slitters, so that as each upper slitter shifts sidewise its coöperating lower slitter shifts with it, the two slitters of each pair thus maintaining their working relationship: 45, four T-slotted reciprocating bars, similar to bracket-carrying bars 33 and 35, there being a pair of these bars 45 for each of the slitter-shafts, these bars 45 being hereinafter termed the swiveling-bars: 46, circumferentially grooved rotary cams for each pair of the swiveling bars 45, that is to say, one of these cams reciprocates one of the swiveling bars 45 pertaining to the upper slitters while the other cam of the pair reciprocates the swiveling bar below the first swiveling bar pertaining to the lower slitters, while the other pair of cams reciprocate the other two swiveling bars pertaining, respectively, to the upper and lower slitters, swiveling-bars being connected with their actuating cams in the same manner as the contouring bars are connected with their cams, namely, by means of pins projecting from the bars and into the grooves of the cams. 47, a slitter-housing, one for each slitter, these slitter-housings and their immediate accessories being hereinafter described in the singular: 48, a spindle forming part of the slitter-housing 47 and pivotally uniting the slitter-housing to its appropriate bracket 34, the axis of this pivoting being at right angles to the slitter-shaft and intersecting the axis of the pivot-shaft and coincident with the face of the slitter: 49, a shaft carried by the slitter-housing 47: 50, a pair of bevel-gears, at each slitter, both gears of the pair being carried by the appropriate bracket 34, one gear of the pair being splined on the appropriate slitter-shaft: 51, a pair of bevel-gears connecting bevel-gears 50 with shaft 49: 52, spur-gearing connecting shaft 49 with the spindle of the slitter, the arrangement of gearing being such that the turning of the slitter-shaft turns the slitter and that the slitter, while being driven, may be swiveled upon the axis of spindle 48: 53, an arm projecting from each slitter-housing 47, the arm pertaining to one of the upper slitters projecting toward one of the upper swiveling-bars 45, while the arm of the next upper slitter projects toward the other upper swiveling-bar, and so on throughout the upper series of slitters, and correspondingly, with the slitters of the lower series: 54, pins projecting from these arms: and 55, arms adjustably bolted at the T-slots of swiveling-bars 45, these arms having forked ends engaging pins 54, there being one of these arms 55 for each of the slitters.

The swiveling of the slitter-housings in the brackets which carry them permit of the slitters being so swiveled as to have their cutting portions tangent to the cut they are producing, and the reciprocation of the swiveling-bars 45 enforces such swiveling on the part of the slitters. It has been heretofore explained that the contouring cams 38 and 39 ought to be formed in correspondence with the character of the contouring to be produced by the slitting, these cams being changed, by substitution, as required by variations in the patterns of the slittings, and it will be manifest that when changes are made in the contouring cams, corresponding changes must be made in the cams 46 to provide for the proper swiveling of the cutters.

I will now explain the system of transmission by means of which the proper driving motions are transmitted to the slitter-shafts and to the cams which actuate the contouring-bars and the swiveling-bars.

Proceeding with the drawings:—56, indicates a driving-shaft extending across the machine: 57, a pulley typifying means by which the driving-shaft may be given its continuous rotary motion: 58, a pinion loose on the driving-shaft: 59, a clutch by means of which this pinion may be locked to the shaft: 60, a gear fast with each pair of the cams, the cams being so secured to these gears, as by the illustrated set-screws, that the cams may be uncoupled from the gears: 61, an intermediate gear connecting pinion 58 with one of cam-gears 60: 62, chains connecting the driving-shaft with the two slitter-shafts 32 and 43: and 63, an intermediate gear connecting all of the cam-gears 60.

The speed of the slitters is immaterial so long as they are run fast enough to do their work properly. By disengaging clutch 59 the cams and the bars operated by them may remain stationary while the slitters are running.

It will be obvious that if the transmitting gearing thus far referred to is in operation driving the slitters and actuating the contouring bars and the swiveling bars, the fabric will be slitted with uniform contours for the strips so long as the fabric is drawn through the slitters at uniform speed.

Looking at Fig. 8 and assuming the fabric to be drawn through the machine at such speed, relative to the rate of reciprocations for the contouring bars as will produce contours having the proportions indicated in Fig. 8, it will be understood that if the rate of advance of the fabric be increased the pattern will be longer in proportion to its width and, on the other hand, if the rate of advance of the fabric be decreased the pattern will be shorter in proportion to its width. It has heretofore been explained that the general width of the pattern may be changed by adjusting the position of the slitter-brackets upon their carrying-bars.

In the manufacture of sole-linings it is customary to make the variations in length in eighths of an inch and I provide, by the changing of a single gear in the train of gearing driving the feed-rolls, for any necessary changes, a matter which will now be explained.

Proceeding with the drawings:—64, indicates a change-gear fast on driving-shaft 56: 65, driving chains connecting the feed-rolls and the winder-rolls in such manner that all these rolls will have the same peripheral velocity: 66, a gear on one of the feed-rolls: 67, a compound gear engaging change-gear 64: 68, an intermediate gear engaging compound gear 67 and gear 66 on the feed-rolls: and 69, an adjustable quadrant carrying gear 67 and serving as means for connecting the gearing of the feed-rolls with change-gear 64 as the latter varies in its diameter.

Assume the feed-rolls and the winder-rolls to have a circumference of nine inches and that change-gear 64 has seventy-two teeth of eight pitch, and that the pattern produced by the slittings has a certain proportion of width to length. If, now, change-gear 64 be changed for one having 71 teeth then the speed of the feed-rolls and winder-rolls will be so reduced as to produce a pattern with the same width-characteristics as before and one-eighth of an inch less in length, and, correspondingly, with other changes in gear 64, each additional tooth in that gear lengthening the pattern one-eighth of an inch. And, similarly, if instead of patterns of the character illustrated in Fig. 8, the slitting cuts of the slittings were represented by parallel waved lines, the depth of the waves would remain unaltered but the distance from crest to crest of the waves would be increased an eighth of an inch by each additional tooth in change-gear 64. It is to be understood that the particular figures given are merely exemplifying.

It is to be understood that I have set forth but a single exemplification of my invention and that the illustrated construction is subject to various modifications within the invention. I have sought to set forth the principle of my invention in the best manner in which I at present contemplate applying that principle.

I claim:—

1. A slitter comprising, feed-mechanism for uniformly advancing the fabric to be slitted, a series of sidewise movable cutters disposed across the fabric to effect its slitting, a second series of cutters disposed across the fabric with its cutters disposed between the cutters of the first series so as to effect intermediate slittings of the fabric, cam-mechanism moving in unison with the feed-mechanism, and connections between the cam-mechanism and both series of cutters to effect the sidewise reciprocation of all of the cutters during the advance of the material, combined substantially as set forth.

2. A slitter comprising, feed-mechanism for uniformly advancing the fabric to be slitted, a frame, a bar mounted for reciprocation in the frame across the fabric, a series of cutters secured to the bar, a second bar arranged for reciprocation in the frame across the fabric parallel with the first bar, a series of cutters carried by the second bar and arranged to act upon the fabric between the cutters carried by the first bar, cam-mechanism moving in unison with the feed-mechanism, and connections between the cam-mechanism and the bars to cause the bars to reciprocate during the advance of the fabric, combined substantially as set forth.

3. A slitter comprising, feed-mechanism for uniformly advancing the fabric to be slitted, a frame, a bar mounted for reciprocation in said frame across the fabric, a series of cutters secured to said bar, a second bar mounted for reciprocation in the frame across the fabric and parallel with the first bar, a series of cutters secured to the second bar and arranged to operate upon the fabric between the cutters carried by the first bar, cam-mechanism moving in unison with the feed-mechanism, and connection between the cam mechanism and the two bars to cause the two bars to shift endwise in opposite directions and at regular intervals during the advance of the material, combined substantially as set forth.

4. A slitter comprising, feed-mechanism for uniformly advancing the fabric to be slitted, a fixed frame-part, a movable frame-part extending across the fabric and hinged to the first frame-part, a series of cutters extending across the movable frame-part and supported by the movable frame-part, and means for rocking the adjustable frame-part on its hinge to move the cutters to and from the fixed frame-part, combined substantially as set forth.

5. A slitter comprising, feed-mechanism for uniformly advancing the material to be slitted, a series of cutters extending across the fabric, means for reciprocating the series of cutters during the advance of the fabric, a bar disposed parallel with the series of cutters in front thereof and adapted for the support of the advancing fabric, a bar disposed parallel with the series of cutters to the rear of the cutter and adapted for the support of the advancing fabric, a roller disposed parallel and in front of said front bar and adapted to engage over the advancing fabric, and a roller disposed to the rear of the rear bar and adapted to engage over the advancing fabric, combined substantially as set forth.

6. A slitter comprising, feed-mechanism for uniformly advancing the fabric to be slitted, a frame, a bar mounted for reciprocation in the frame across over the fabric, a series of rotary cutters carried by said bar, a second bar mounted for reciprocation in the frame below the fabric, a series of rotary cutters carried by the second bar and coöperating with the cutters carried by the first bar, cam-mechanism moving in unison with the feed-mechanism to serve in reciprocating both bars, and connections between the cam-mechanism and the two bars to cause the bars to move simultaneously and maintain the cutters of the two series in coöperative relationship, combined substantially as set forth.

7. A slitter comprising, feed-mechanism for uniformly advancing the fabric to be slitted, a frame, a bar mounted for reciprocation in the frame across the fabric, a series of brackets carried by the bar, cam-mechanism moving in unison with the feed-mechanism, connections between the cam-mechanism and the bar to cause the series of brackets to reciprocate, a cutter-housing swiveled in each of the brackets, a cutter carried by each cutter-housing, a second bar mounted for reciprocation in the frame across the fabric, cam-mechanism moving in unison with the first cam-mechanism to serve in reciprocating the second bar, and connections between the second bar and the cutter-housings to serve in swiveling the cutters into tangential relationship to their lines of slitting, combined substantially as set forth.

8. A slitter comprising, feed-mechanism for uniformly advancing the material to be slitted, a frame, a pair of bracket-carrying bars mounted for reciprocation in the frame over the fabric, a series of brackets carried by each bar, a cutter-housing swiveled in each bracket, a cutter carried by each cutter-housing, a pair of swiveling-bars mounted for reciprocation in the frame over the fabric, connections between one of the swiveling bars and the brackets carried by one of the bracket-carrying bars, connections between the other swiveling-bar and the brackets carried by the other bracket-carrying bar, cam-mechanism moving in unison with the feed-mechanism, and connections between the cam-mechanism and the four bars, combined substantially as set forth.

9. A slitter comprising, feed-mechanism for advancing the fabric to be slitted, a frame, an upper slitter-shaft journaled in the frame across over the fabric, a lower slitter-shaft journaled in the frame across under the fabric, a pair of bracket-carrying bars mounted for reciprocation in the frame across over the fabric, a series of brackets carried by each of said bars, a pair of lower bracket-carrying bars mounted for reciprocation in the frame across under the fabric, a series of brackets secured to each of the lower bracket-carrying bars, a cutter-housing swiveled in each of the brackets, a cutter carried by each cutter-housing, a pair of upper swiveling bars mounted for reciprocation in the frame above the fabric, a pair of lower swiveling bars mounted for reciprocation in the frame across under the fabric, connections from each cutter-housing to one of the swiveling bars, cam-mechanism moving in unison with the feed-mechanism, and connections between the cam-mechanism and the reciprocating bars, combined substantially as set forth.

10. A slitter comprising, feed-mechanism for uniformly advancing the fabric to be slitted, a series of cutters extending across the fabric to effect its slitting during its advance, a first winding-shaft disposed in advance of the feed-mechanism and adapted to receive and wind up some of the strips resulting from the slitting, a winder-roll disposed parallel with said first winding-shaft and adapted to engage rolls of material upon said winding-shaft, a second winding-shaft adapted to receive and wind up other strips resulting from the slitting, a second winder-roll coöperating with the second winding shaft to cause said other strips to be wound upon the second winding-shaft, means for urging the winding-shafts toward their respective winder-rolls, and transmitting mechanism connecting the feed-mechanism and said winder-rolls, combined substantially as set forth.

11. A slitter comprising, feed-mechanism for uniformly advancing the fabric to be slitted, a series of cutters extending across the fabric to effect its slitting during its advance, a first winding-shaft disposed in advance of the feed-mechanism and adapted to receive and wind up some of the strips resulting from the slitting, a winder-roll disposed parallel with said first winding-shaft and adapted to engage rolls of material upon said winding-shaft, a second winding-shaft adapted to receive and wind up other strips resulting from the slitting, a second winder-roll coöperating with the second winding shaft to cause said other strips to be wound upon the second winding-shaft, means for urging the winding-shafts toward their respective winder-rolls, an extra support adapted to receive one of said winding-shafts with its rolls of strips, a third winding-shaft adapted to receive and wind up strips from previously wound rolls, a winder-roll to coöperate with the third winding-shaft, and transmitting mechanism connecting the feed-mechanism and the three winder-rolls, combined substantially as set forth.

12. A slitter comprising, a slitter-shaft, a bracket supporting said shaft, means for reciprocating the bracket on the shaft, a slitter-housing swiveled in the bracket, a rotary slitter carried by the slitter-housing with its face in the plane of the axis of swiveling of the slitter-housing, a gear splined on the slitter-shaft, gearing connecting said gear and the slitter, an arm projecting from the slitter-housing, and means for rocking said arm and swiveling the slitter as the bracket reciprocates on the slitter-shaft, combined substantially as set forth.

13. A slitter comprising, a first slitter-shaft, a first series of rotary slitters driven thereby, a second slitter-shaft, a second series of slitters driven by the second slitter-shaft coöperating with the first series of slitters, a fixed frame-part supporting one of the slitter-shafts, a movable frame-part supporting the other slitter-shaft, and means for moving the movable frame-part away from the fixed frame-part so that the two series of slitters may be separated from each other, combined substantially as set forth.

14. A slitter comprising, a first slitter-shaft, a first series of rotary slitters driven thereby, a second slitter-shaft, a second series of slitters driven by the second slitter-shaft coöperating with the first series of slitters, a fixed frame-part supporting one of the slitter-shafts, a movable frame-part supporting the other slitter-shaft, means for moving the movable frame part away from the fixed frame-part so that the two series of slitters may be separated from each other, brackets carrying one series of the slitters, a connection between said brackets to cause the brackets to move coincidently endwise of the series, and means for adjusting said connection endwise to move said brackets and separate their slitters sidewise from the coöperative slitters, combined substantially as set forth.

15. In a slitting machine the combination of a feed holder for a sheet in rolled form, a plurality of pairs of slitters, a swivel mounting for each slitter, a transversely movable mounting for each slitter, means for feeding said sheet between the slitters of each pair, and means for moving the slitters transversely to the sheet and simultaneously swiveling them.

16. In slitting apparatus, the combination of a holder for a sheet in roll form, sheet feeding means, a series of rotary cutters, means for positively driving the cutters at greater speed than the linear speed of the sheet at the point of cutting contact, automatic means for traversing the cutters sidewise, and automatic means for swiveling the cutters.

17. In mechanism for slitting sheets of the character described, the combination of sheet feeding means, a coöperating pair of overlapping, rotary shearing cutters, and means for positively revolving both of the cutters and traversing them laterally as the sheet is fed between them.

18. In mechanism for slitting sheets of the character described, the combination of sheet feeding means, a coöperating pair of rotary cutters, swivel mounting for the cutters, and means for rotating the cutters, reciprocating them laterally and swiveling them to maintain them in tangent relation to the line of cut.

19. In mechanism for slitting sheets of the character described, the combination of sheet feeding means, a coöperating pair of rotary cutters, swivel mounting for the cutters, and means for positively rotating the cutters, reciprocating them laterally and swiveling them to maintain them in tangent relation to the line of cut.

20. In mechanism for slitting sheets of the character described, the combination of sheet feeding means, a coöperating pair of rotary cutters, swivel mounting for the cutters, and means for rotating the cutters, automatically reciprocating them laterally and swiveling them to maintain them in tangent relation to the line of cut.

21. In mechanism for slitting sheets of the character described, the combination of means for feeding the sheet, a coöperating pair of rotary cutters, swivel mounting therefor, means for traversing the cutters laterally and simultaneously swiveling them, and means for positively driving the cutters in any of their positions.

22. In mechanism for slitting sheets of the character described, the combination of means for feeding the sheet, a coöperating pair of rotary cutters, swivel mounting therefor, means for traversing the cutters laterally and simultaneously swiveling them, and means for positively driving the cutters in any of their positions at a speed greater than the linear speed of the sheet.

VICTOR EDMUND JULLIEN.

Witnesses:
W. N. DAVIDSON,
JOHN W. BLAKENEY.